US012072618B2

(12) United States Patent
Tanaka

(10) Patent No.: US 12,072,618 B2
(45) Date of Patent: Aug. 27, 2024

(54) LIGHT SOURCE DEVICE AND PROJECTION DISPLAY APPARATUS

(71) Applicant: Panasonic Intellectual Property Management Co., Ltd., Osaka (JP)

(72) Inventor: Takaaki Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 296 days.

(21) Appl. No.: 17/349,221

(22) Filed: Jun. 16, 2021

(65) Prior Publication Data

US 2021/0405517 A1    Dec. 30, 2021

(30) Foreign Application Priority Data

Jun. 25, 2020 (JP) ................. 2020-109220

(51) Int. Cl.
| | |
|---|---|
| G03B 21/20 | (2006.01) |
| G02B 5/26 | (2006.01) |
| G02B 5/30 | (2006.01) |
| G02B 27/28 | (2006.01) |
| G03B 33/12 | (2006.01) |

(52) U.S. Cl.
CPC ........... *G03B 21/2073* (2013.01); *G02B 5/26* (2013.01); *G02B 5/3083* (2013.01); *G02B 27/283* (2013.01); *G03B 21/2013* (2013.01); *G03B 21/2033* (2013.01); *G03B 33/12* (2013.01)

(58) Field of Classification Search
CPC ............ G03B 21/2073; G03B 21/2013; G03B 21/2033; G03B 33/12; G02B 5/26; G02B 5/3083

USPC .......................................................... 353/20
See application file for complete search history.

(56) References Cited

U.S. PATENT DOCUMENTS

| | | | |
|---|---|---|---|
| 9,304,323 B2 * | 4/2016 | Khrushchev | ........... G03B 21/28 |
| 2012/0182484 A1 | 7/2012 | Imai et al. | |
| 2016/0301904 A1 | 10/2016 | Imai et al. | |
| 2019/0064400 A1 | 2/2019 | Tanaka | |

(Continued)

FOREIGN PATENT DOCUMENTS

| | | |
|---|---|---|
| JP | 4-101115 | 4/1992 |
| JP | 2019-40177 | 3/2019 |
| JP | 2019-207394 | 12/2019 |

(Continued)

*Primary Examiner* — Jerry L Brooks
(74) *Attorney, Agent, or Firm* — Wenderoth, Lind & Ponack, L.L.P.

(57) ABSTRACT

A light source device includes: a plurality of first laser light sources, a second laser light source, and a plurality of third laser light sources; a first polarization mirror that combines light from the plurality of first laser light sources and transmits light from the second laser light source; a dichroic mirror that combines the light from the plurality of first laser light sources and the light from the second laser light source; a second polarization mirror that combines light from the plurality of third laser light sources and transmits the light from the plurality of first laser light sources and the light from the second laser light source; a retardation plate that converts polarization of light from the second polarization mirror into circular polarization; and a filter element that reflects light from the retardation plate.

10 Claims, 8 Drawing Sheets

(56) References Cited

U.S. PATENT DOCUMENTS

2019/0361255 A1  11/2019  Otani
2019/0394429 A1  12/2019  Tanaka

FOREIGN PATENT DOCUMENTS

| JP | 2020-3519 | 1/2020 |
| WO | 2011/037026 | 3/2011 |
| WO | 2013/079241 | 6/2013 |

\* cited by examiner

LIGHT SOURCE DEVICE AND PROJECTION DISPLAY APPARATUS

BACKGROUND

1. Technical Field

The present disclosure relates to a projection display apparatus that irradiates an image formed on an image forming element with illumination light and enlarges and projects the image on a screen by a projection lens.

2. Description of the Related Art

As a light source of a projection display apparatus using a mirror-deflection-type digital micromirror device (DMD) or an image forming element of a liquid crystal panel, many light source devices using a long-life solid-state light source such as a semiconductor laser or a light emitting diode are disclosed. Among them, a light source device having a wide color gamut and high efficiency using blue, green, and red laser light sources is disclosed. A conventional light source device using a solid state light source includes blue, green, and red laser light sources, a compact dichroic mirror that combines condensed light from the laser light sources, a transmission rotary diffusion plate, and a diffusion plate disposed in front of the rotary diffusion plate, and with this configuration, a reduction in size of the light source device is achieved with speckle noise and small luminance unevenness being eliminated (Patent Literature (PTL) 1).

PTL 1 is Unexamined Japanese Patent Publication No. 2019-40177.

SUMMARY

Examples of a method for increasing luminance while achieving reduction in size of a conventional light source device include a method for subjecting light beams from a plurality of blue, green, and red laser light sources to wavelength beam combining by a dichroic mirror, a method for combining the light beams by a polarization beam splitter, and a method for spatially combining the light beams such that the light beams from the respective laser light sources do not overlap each other. Therefore, constructing a compact and highly efficient light source device capable of increasing luminance by methods including the abovementioned methods and a projection display apparatus using the light source device is a problem to be addressed.

A light source device according to the present disclosure includes: a plurality of first laser light sources, a second laser light source, and a plurality of third laser light sources; a first polarization mirror that combines light from the plurality of first laser light sources and transmits light from the second laser light source; a dichroic mirror that combines the light from the plurality of first laser light sources and the light from the second laser light source; a second polarization mirror that combines light from the plurality of third laser light sources and transmits the light from the plurality of first laser light sources and the light from the second laser light source; a retardation plate that converts polarization of light from the second polarization mirror into circular polarization; and a filter element that reflects light from the retardation plate.

According to the present disclosure, light beams from the plurality of laser light sources that are green, blue, and red laser light sources are efficiently combined in a compact manner due to the polarization mirror having characteristics of a polarization beam splitter and a dichroic mirror, the retardation plate, and the filter element. For this reason, a light source device having a small size, high efficiency, and high luminance can be constructed. Further, by using the light source device, a projection display apparatus having a wide color gamut, a small size, and high luminance can be achieved.

DETAILED DESCRIPTION

Modes for carrying out the present disclosure will be described below with reference to the drawings.

First Exemplary Embodiment

Figure 1:
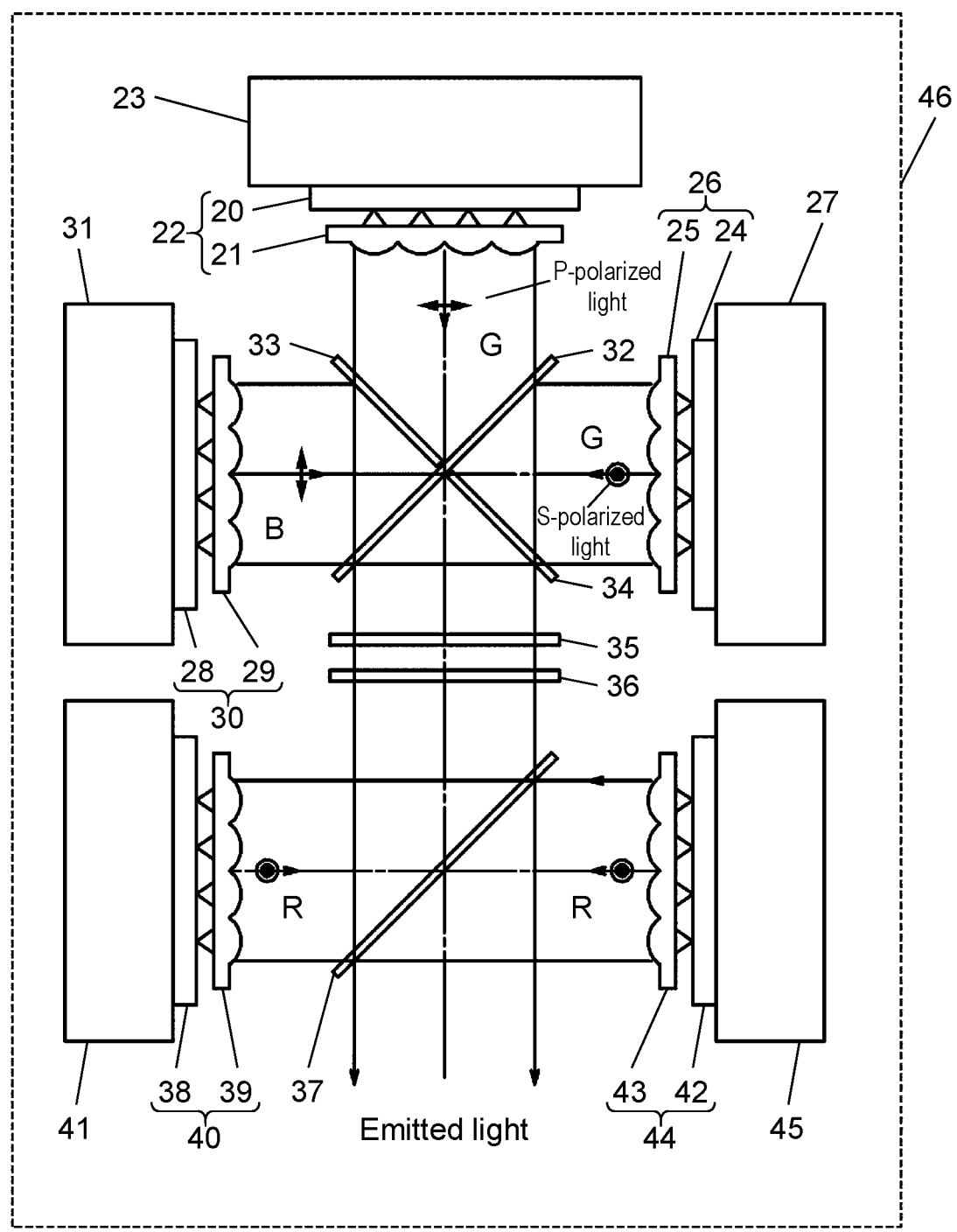
FIG. 1 is a configuration diagram of a light source device according to a first exemplary embodiment of the present disclosure.

FIG. 1 is a configuration diagram of first light source device 46 according to a first exemplary embodiment of the present disclosure.

First light source device 46 includes green laser light sources 22, 26, blue laser light source 30, and red laser light sources 40, 44.

Green laser light source 22 includes green semiconductor laser substrate 20 on which a plurality of green semiconductor laser elements is disposed and collimating lens array 21, and green laser light source 26 includes green semiconductor laser substrate 24 on which a plurality of green semiconductor laser elements is disposed and collimating lens array 25. Blue laser light source 30 includes blue semiconductor laser substrate 28 on which a plurality of blue semiconductor laser elements is disposed and collimating lens array 29. Red laser light source 40 includes red semiconductor laser substrate 38 on which a plurality of red semiconductor laser elements is disposed and collimating lens array 39, and red laser light source 44 includes red semiconductor laser substrate 42 on which a plurality of red semiconductor laser elements is disposed and collimating lens array 43.

First light source device 46 further includes heat sinks 23, 27, 31, 41, 45, first polarization mirror 32, blue reflecting dichroic mirrors 33, 34, blue and green transmitting filter 35 which is a filter element, quarter wavelength plate 36 as a retardation plate, and second polarization mirror 37. FIG. 1 illustrates polarization directions of light emitted from laser light sources. Green laser light sources 22, 26 are examples of first laser light sources, blue laser light source 30 is an example of a second laser light source, and red laser light sources 40, 44 are examples of third laser light sources.

Green laser light source 22 includes collimating lens array 21 and green semiconductor laser substrate 20 on which 24 (6×4) green semiconductor laser elements are two-dimensionally arrayed at regular intervals. Green semiconductor laser substrate 20 emits green color light with a wavelength width of 525±8 nm, and emits light which is P-polarized with respect to first polarization mirror 32. The light emitted from green semiconductor laser substrate 20 is condensed and converted into parallel light fluxes by corresponding collimating lens array 21. Heat sink 23 cools green semiconductor laser substrate 20.

Green laser light source 26 includes collimating lens array 25 and green semiconductor laser substrate 24 on which 24 (6×4) green semiconductor laser elements are two-dimensionally arrayed at regular intervals. Green semiconductor laser substrate 24 emits green color light with a wavelength width of 525±8 nm, and emits light which is S-polarized with respect to first polarization mirror 32. The light emitted from green semiconductor laser substrate 24 is condensed and converted into parallel light fluxes by corresponding collimating lens array 25. Heat sink 27 cools green semiconductor laser substrate 24.

Blue laser light source 30 includes collimating lens array 29 and blue semiconductor laser substrate 28 on which 12 (3×4) blue semiconductor laser elements are two-dimensionally arrayed at regular intervals. Blue semiconductor laser substrate 28 emits blue color light with a wavelength width of 465±8 nm, and emits light which is P-polarized with respect to first polarization mirror 32. Since the blue semiconductor laser has higher luminous efficiency and smaller light output required for desired white light chromaticity than the red and green semiconductor lasers, a number of blue semiconductor lasers is about one-fourth a number of red or green semiconductor lasers. The light emitted from blue semiconductor laser substrate 28 is condensed and converted into parallel light fluxes by corresponding collimating lens array 29. Heat sink 31 cools blue semiconductor laser substrate 28.

Laser beams from green laser light sources 22, 26 and blue laser light source 30 enter first polarization mirror 32 and blue reflecting dichroic mirrors 33, 34 as P-polarized light, S-polarized light, and P-polarized light, respectively. First polarization mirror 32 and blue reflecting dichroic mirrors 33, 34 are disposed such that an incidence angle is 45 degrees. Blue reflecting dichroic mirrors 33, 34 are disposed so as to cross the first polarization mirror.

Figure 2:
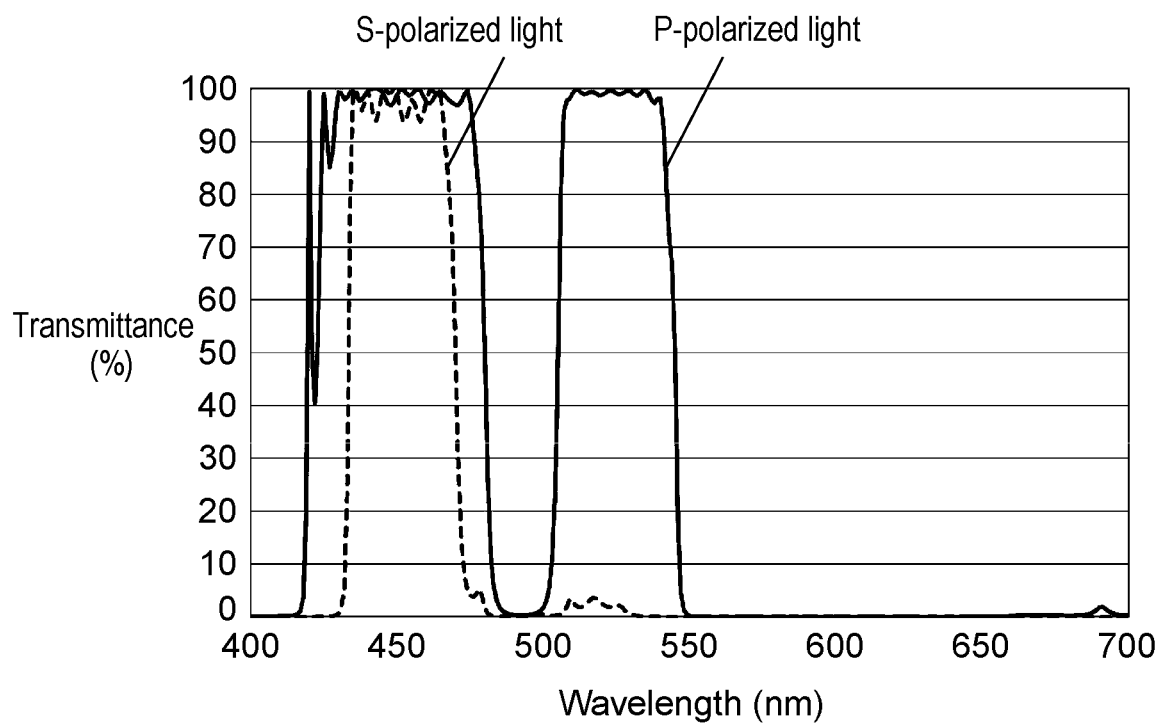
FIG. 2 is a diagram illustrating spectral characteristics of a first polarization mirror in the first exemplary embodiment.

FIG. 2 illustrates spectral characteristics of first polarization mirror 32. The spectral characteristics indicate spectral transmission factors of P-polarized light and S-polarized light at an incidence angle of 45 degrees. FIG. 2 shows the spectral characteristics of an example designed such that high refractive index materials such as TiO2 and low refractive index materials such as SiO2 are alternately laminated to form 86 optical thin films on a glass substrate of the first polarization mirror. First polarization mirror 32 has a characteristic of functioning as a polarization beam splitter for green laser beam and functioning as a blue transmitting dichroic mirror for blue laser beam. First polarization mirror 32 transmits 95% or more of P-polarized blue laser beam and P-polarized green laser beam, and reflects 95% or more of S-polarized green laser beam.

Blue reflecting dichroic mirrors 33, 34 have characteristics of transmitting 95% or more of green laser beam and reflecting 97% or more of blue laser beam. The half-value wavelength at which the transmittance is 50% is 485 nm for P-polarized light and 505 nm for S-polarized light.

The plurality of green laser beams entering first polarization mirror 32 and blue reflecting dichroic mirrors 33, 34 are combined using polarization while passing through the blue reflecting dichroic mirrors. In addition, the blue laser beam is reflected by blue reflecting dichroic mirrors 33, 34 while passing through first polarization mirror 32. Since first polarization mirror 32 and blue reflecting dichroic mirrors 33, 34 cross each other, light beams from the plurality of green laser light sources and the blue laser light source can be combined in a compact manner. The combined green laser beams and blue laser beam enter blue and green transmitting filter 35.

Red laser light source 40 includes collimating lens array 39 and red semiconductor laser substrate 38 on which 24 (6×4) red semiconductor laser elements are two-dimensionally arrayed at regular intervals. Red semiconductor laser substrate 38 emits red color light with a wavelength width of 640±8 nm, and emits light which is S-polarized with respect to second polarization mirror 37. The light emitted from red semiconductor laser substrate 38 is condensed and converted into parallel light fluxes by corresponding collimating lens array 39. Heat sink 41 cools red semiconductor laser substrate 38.

Red laser light source 44 includes collimating lens array 43 and red semiconductor laser substrate 42 on which 24 (6×4) red semiconductor laser elements are two-dimensionally arrayed at regular intervals. Red semiconductor laser substrate 42 emits red color light with a wavelength width of 640±8 nm, and emits light which is S-polarized with respect to second polarization mirror 37. The light emitted from red semiconductor laser substrate 42 is condensed and converted into parallel light fluxes by corresponding collimating lens array 43. Heat sink 45 cools red semiconductor laser substrate 42.

The laser beams from red laser light sources 40, 44 enter second polarization mirror 37 as S-polarized light. Second polarization mirror 37 is disposed such that the incidence angle is 45 degrees.

Figure 3:
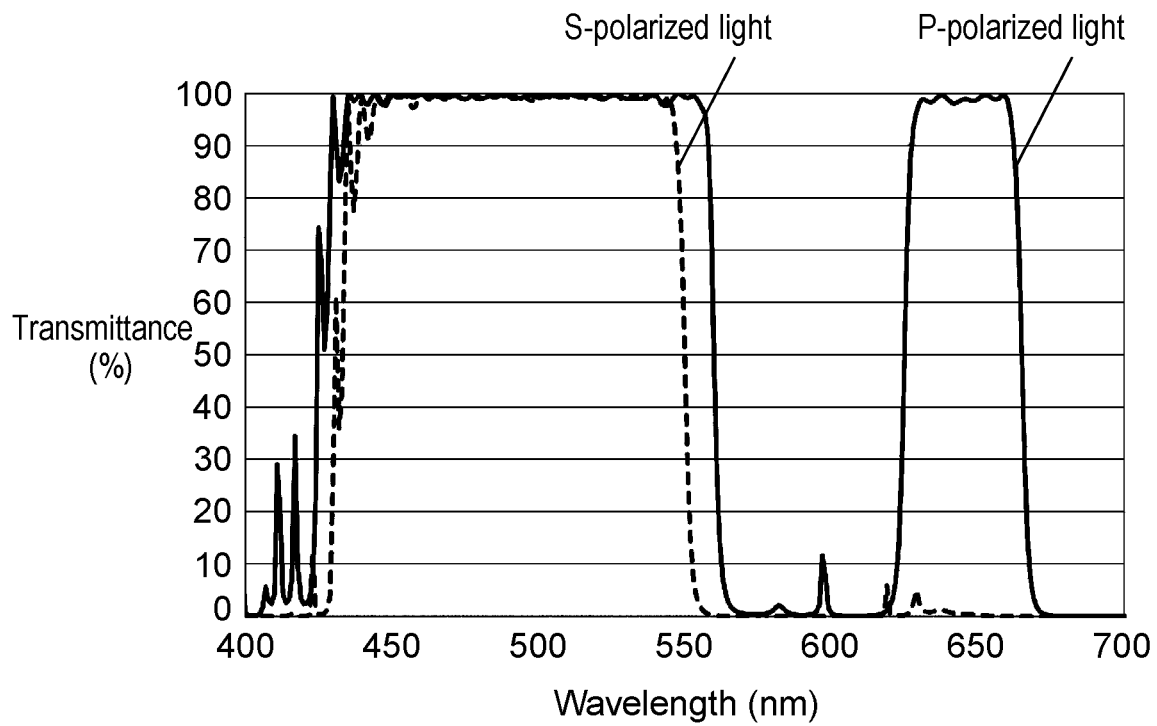
FIG. 3 is a diagram illustrating spectral characteristics of a second polarization mirror in the first exemplary embodiment.

FIG. 3 illustrates spectral characteristics of the second polarization mirror. The spectral characteristics indicate spectral transmission factors of P-polarized light and S-polarized light at an incidence angle of 45 degrees. FIG. 3 shows the spectral characteristics of an example designed such that high refractive index materials such as TiO2 and low refractive index materials such as SiO2 are alternately laminated to form 89 optical thin films on a glass substrate of the second polarization mirror. Second polarization mirror 37 has a characteristic of functioning as a polarization beam splitter for red laser beam and functioning as a green transmitting dichroic mirror and a blue transmitting dichroic mirror for green laser beam and blue laser beam, respectively. Second polarization mirror 37 transmits 95% or more of P-polarized red laser beam, P-polarized and S-polarized green laser beams, and P-polarized and S-polarized blue laser beams, and reflects 95% or more of S-polarized red laser beam.

The S-polarized light from red laser light source 40 is reflected by second polarization mirror 37 and enters quarter wavelength plate 36. Quarter wavelength plate 36 is a retardation plate having a retardation of a quarter wavelength near the wavelength of the emission center of red laser light source 40. Quarter wavelength plate 36 is disposed with an optical axis of 45 degrees when the P-polarization direction in FIG. 1 is defined as 0 degrees. Quarter wavelength plate 36 is a thin film retardation plate utilizing birefringence by oblique vapor deposition of a dielectric material. The thin film retardation plate is made of an inorganic material, and is excellent in durability and reliability like inorganic optical crystals such as quartz. The red laser beam having passed through quarter wavelength plate 36 and converted into circularly polarized light enters blue and green transmitting filter 35 that is provided with a reflective film such as a multilayer dielectric film, transmits green laser beam and blue laser beam, and reflects red laser beam. The red laser beam reflected by blue and green transmitting filter 35 is inverted in phase to be reversely circularly polarized light, passes through quarter wavelength plate 36, and is converted into P-polarized light. The P-polarized red laser beam whose polarization direction has been converted by quarter wavelength plate 36 again enters second polarization mirror 37 and passes therethrough. The S-polarized light from red laser light source 44 is reflected by second polarization mirror 37. In this way, light beams from the plurality of red laser light sources are combined.

On the other hand, the P-polarized and S-polarized green laser beams and the P-polarized blue laser beam transmitted through blue and green transmitting filter 35 change in phase by quarter wavelength plate 36 to be elliptically polarized beams, and pass through second polarization mirror 37.

In this manner, the blue, green, and red laser beams are combined in a compact and highly efficient manner to emit white light.

Although the thin film retardation plate has been described as quarter wavelength plate 36, a microstructural retardation plate utilizing birefringence generated in a periodic microstructure smaller than the wavelength of light may be used.

Although the green laser light source, the red laser light source, and the blue laser light source have configurations in which 48, 48, and 12 semiconductor laser elements are arrayed, respectively, they may be configured using more semiconductor laser elements for increasing luminance. A plurality of light source devices 46 may be used to increase luminance.

Although the first laser light source is a green laser light source and the third laser light source is a red laser light source in the above description, the first laser light source may be a red laser light source and the third laser light source may be a green laser light source by changing characteristics of the first and second polarization mirrors, the dichroic mirror, the retardation plate, the filter element, and the like.

As described above, the first light source device according to the present disclosure can be constructed as a compact and highly efficient light source device having wider color gamut due to the configuration using the blue, green, and red laser light sources, the polarization mirrors having characteristics of a polarization beam splitter and a dichroic mirror, the retardation plate, and the filter element.

Second Exemplary Embodiment

Figure 4:
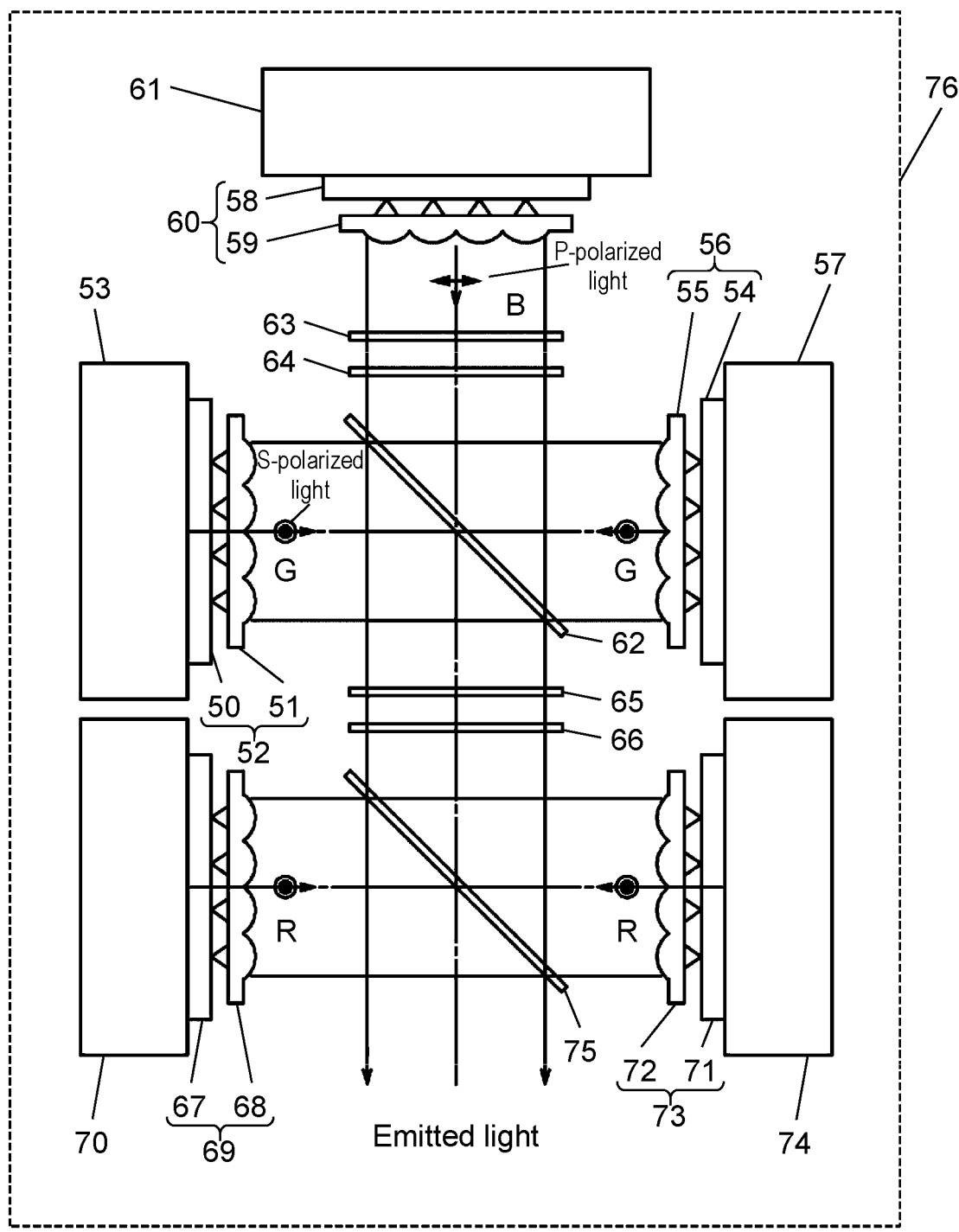
FIG. 4 is a configuration diagram of a light source device according to a second exemplary embodiment of the present disclosure.

FIG. 4 is a configuration diagram of second light source device 76 according to a second exemplary embodiment of the present disclosure.

Second light source device 76 includes green laser light sources 52, 56, blue laser light source 60, and red laser light sources 69, 73.

Green laser light source 52 includes green semiconductor laser substrate 50 on which a plurality of green semiconductor laser elements is disposed and collimating lens array 51, and green laser light source 56 includes green semiconductor laser substrate 54 on which a plurality of green semiconductor laser elements is disposed and collimating lens array 55. Blue laser light source 60 includes blue semiconductor laser substrate 58 on which a plurality of blue semiconductor laser elements is disposed and collimating lens array 59. Red laser light source 69 includes red semiconductor laser substrate 67 on which a plurality of red semiconductor laser elements is disposed and collimating lens array 68, and red laser light source 73 includes red semiconductor laser substrate 71 on which a plurality of red semiconductor laser elements is disposed and collimating lens array 72.

Second light source device 76 further includes heat sinks 53, 57, 61, 70, 74, first polarization mirror 62, blue transmitting filter 63 which is a first filter element, first quarter wavelength plate 64 which is a first retardation plate, blue and green transmitting filter 65 which is a second filter element, second quarter wavelength plate 66 which is a second retardation plate, and second polarization mirror 75. FIG. 4 illustrates polarization directions of light beams emitted from laser light sources. Green laser light sources 52, 56 are examples of first laser light sources, blue laser light source 60 is an example of a second laser light source, and red laser light sources 69, 73 are examples of third laser light sources. The configuration of the second exemplary embodiment is different from the configuration of the first exemplary embodiment in FIG. 1 in that the dichroic mirror crossing the first polarization mirror is not provided, and a plurality of retardation plates and a plurality of filter elements are disposed.

Green laser light source 52 includes collimating lens array 51 and green semiconductor laser substrate 50 on which 24 (6×4) green semiconductor laser elements are two-dimensionally arrayed at regular intervals. Green semiconductor laser substrate 50 emits green color light with a wavelength width of 525±8 nm, and emits light which is S-polarized with respect to first polarization mirror 62. The light emitted from green semiconductor laser substrate 50 is condensed and converted into parallel light fluxes by corresponding collimating lens array 51. Heat sink 53 cools green semiconductor laser substrate 50.

Green laser light source 56 includes collimating lens array 55 and green semiconductor laser substrate 54 on which 24 (6×4) green semiconductor laser elements are two-dimensionally arrayed at regular intervals. Green semiconductor laser substrate 54 emits green color light with a wavelength width of 525±8 nm, and emits light which is S-polarized with respect to first polarization mirror 62. The light emitted from green semiconductor laser substrate 54 is condensed and converted into parallel light fluxes by corresponding collimating lens array 55. Heat sink 57 cools green semiconductor laser substrate 54.

Blue laser light source 60 includes collimating lens array 59 and blue semiconductor laser substrate 58 on which 12 (3×4) blue semiconductor laser elements are two-dimensionally arrayed at regular intervals. Blue semiconductor laser substrate 58 emits blue color light with a wavelength width of 465±8 nm, and emits light which is P-polarized with respect to first polarization mirror 62. Since the blue semiconductor laser has higher luminous efficiency and smaller light output required for desired white light chromaticity than the red and green semiconductor lasers, a number of blue semiconductor lasers is about one-fourth a number of red or green semiconductor lasers. The light emitted from blue semiconductor laser substrate 58 is condensed and converted into parallel light fluxes by corresponding collimating lens array 59. Heat sink 61 cools blue semiconductor laser substrate 58.

The laser beams from green laser light sources 52, 56 enter first polarization mirror 62 as S-polarized light. First polarization mirror 62 is disposed such that the incidence angle is 45 degrees.

The first polarization mirror has the spectral characteristics illustrated in FIG. 2. First polarization mirror 62 transmits 95% or more of P-polarized blue laser beam and P-polarized green laser beam, and reflects 95% or more of S-polarized green laser beam.

The S-polarized light from green laser light source 56 is reflected by first polarization mirror 62 and enters first quarter wavelength plate 64. First quarter wavelength plate 64 is a retardation plate having a retardation of a quarter wavelength near the wavelength of the emission center of green laser light source 56. First quarter wavelength plate 64 is disposed with an optical axis of 45 degrees when the P-polarization direction in FIG. 4 is defined as 0 degrees. First quarter wavelength plate 64 is a thin film retardation plate utilizing birefringence by oblique vapor deposition of a dielectric material. The thin film retardation plate is made of an inorganic material, and is excellent in durability and reliability like inorganic optical crystals such as quartz. The green laser beam having passed through first quarter wavelength plate 64 and converted into circularly polarized light enters blue transmitting filter 63 that is provided with a reflective film such as a multilayer dielectric film, transmits blue laser beam, and reflects green laser beam. The green laser beam reflected by blue transmitting filter 63 is inverted in phase to be reversely circularly polarized light, passes through first quarter wavelength plate 64, and is converted into P-polarized light. The P-polarized green laser beam whose polarization direction has been converted by first quarter wavelength plate 64 again enters first polarization mirror 62 and passes therethrough. The S-polarized light from green laser light source 52 is reflected by first polarization mirror 62. In this way, laser beams from the plurality of green laser light sources 56, 52 are combined.

On the other hand, the P-polarized blue laser beam having passed through blue transmitting filter 63 changes in phase by first quarter wavelength plate 64 to be converted into elliptically polarized light, and passes through first polariziation mirror 62. In this way, the blue and green laser beams are combined in a compact and highly efficient manner, and enter blue and green transmitting filter 65.

Red laser light source 69 includes collimating lens array 68 and red semiconductor laser substrate 67 on which 24 (6×4) red semiconductor laser elements are two-dimensionally arrayed at regular intervals. Red semiconductor laser substrate 67 emits red color light with a wavelength width of 640±8 nm, and emits light which is S-polarized with respect to second polarization mirror 75. The light emitted from red semiconductor laser substrate 67 is condensed and converted into parallel light fluxes by corresponding collimating lens array 68. Heat sink 70 cools red semiconductor laser substrate 67.

Red laser light source 73 includes collimating lens array 72 and red semiconductor laser substrate 71 on which 24 (6×4) red semiconductor laser elements are two-dimensionally arrayed at regular intervals. Red semiconductor laser substrate 71 emits red color light with a wavelength width of 640±8 nm, and emits light which is S-polarized with respect to second polarization mirror 75. The light emitted from red semiconductor laser substrate 71 is condensed and converted into parallel light fluxes by corresponding collimating lens array 72. Heat sink 74 cools red semiconductor laser substrate 71.

The laser beams from red laser light sources 69, 73 enter second polarization mirror 75 as S-polarized light. Second polarization mirror 75 is disposed such that the incidence angle is 45 degrees.

The second polarization mirror has the spectral characteristics illustrated in FIG. 3. Second polarization mirror 75 has a characteristic of functioning as a polarization beam splitter for red laser beam and functioning as a green transmitting dichroic mirror and a blue transmitting dichroic mirror for green laser beam and blue laser beam, respectively. Second polarization mirror 75 transmits 95% or more of P-polarized red laser beam, P-polarized and S-polarized green laser beams, and P-polarized and S-polarized blue laser beams, and reflects 95% or more of S-polarized red laser beam.

The S-polarized light from red laser light source 73 is reflected by second polarization mirror 75 and enters second quarter wavelength plate 66. Second quarter wavelength plate 66 is a retardation plate having a retardation of a quarter wavelength near the wavelength of the emission center of red laser light source 73. Second quarter wavelength plate 66 is disposed with an optical axis of 45 degrees when the P-polarization direction in FIG. 4 is defined as 0 degrees. Second quarter wavelength plate 66 is a thin film retardation plate utilizing birefringence by oblique vapor deposition of a dielectric material. The thin film retardation plate is made of an inorganic material, and is excellent in durability and reliability like inorganic optical crystals such as quartz. The red laser beam having passed through second quarter wavelength plate 66 to be converted into circularly polarized light enters blue and green transmitting filter 65 that is provided with a reflective film such as a multilayer dielectric film, transmits blue laser beam and green laser beam, and reflects red laser beam. The red laser beam reflected by blue and green transmitting filter 65 is inverted in phase to be reversely circularly polarized light, passes through second quarter wavelength plate 66, and is converted into P-polarized light. The P-polarized red laser beam whose polarization direction has been converted by second quarter wavelength plate 66 again enters second polarization mirror 75 and passes therethrough. The S-polarized light from red laser light source 69 is reflected by second polarization mirror 75. In this way, the laser beams from the plurality of red laser light sources 69, 73 are combined.

The blue and green laser beams transmitted through blue and green transmitting filter 65 pass through second quarter wavelength plate 66, are converted into elliptically polarized light, and pass through second polarization mirror 75.

In this manner, the blue, green, and red laser beams are combined in a compact and highly efficient manner to emit white light.

Unlike the configuration of first light source device 46 illustrated in FIG. 1, second light source device 76 does not include a dichroic mirror crossing the first polarization mirror. Therefore, the blue laser beam and the green laser beam can be combined with high efficiency without loss of light passing through and reflected by the crossing part.

Although the thin film retardation plate has been described as quarter wavelength plates 64, 66, a microstructural retardation plate utilizing birefringence generated in a periodic microstructure smaller than the wavelength of light may be used.

Although the green laser light source, the red laser light source, and the blue laser light source have configurations in which 48, 48, and 12 semiconductor laser elements are arrayed, respectively, they may be configured using more semiconductor laser elements for increasing luminance. A plurality of light source devices 76 may be used to increase luminance.

Although the first laser light source is a green laser light source and the third laser light source is a red laser light source in the above description, the first laser light source may be a red laser light source and the third laser light source may be a green laser light source by changing characteristics of the first and second polarization mirrors and the filter element.

As described above, the second light source device according to the present disclosure can be constructed as a compact and highly efficient light source device having wider color gamut due to the configuration using the blue, green, and red laser light sources, the polarization mirrors having characteristics of a polarization beam splitter and a dichroic mirror, the plurality of retardation plates, and the filter element.

Third Exemplary Embodiment

Figure 5:
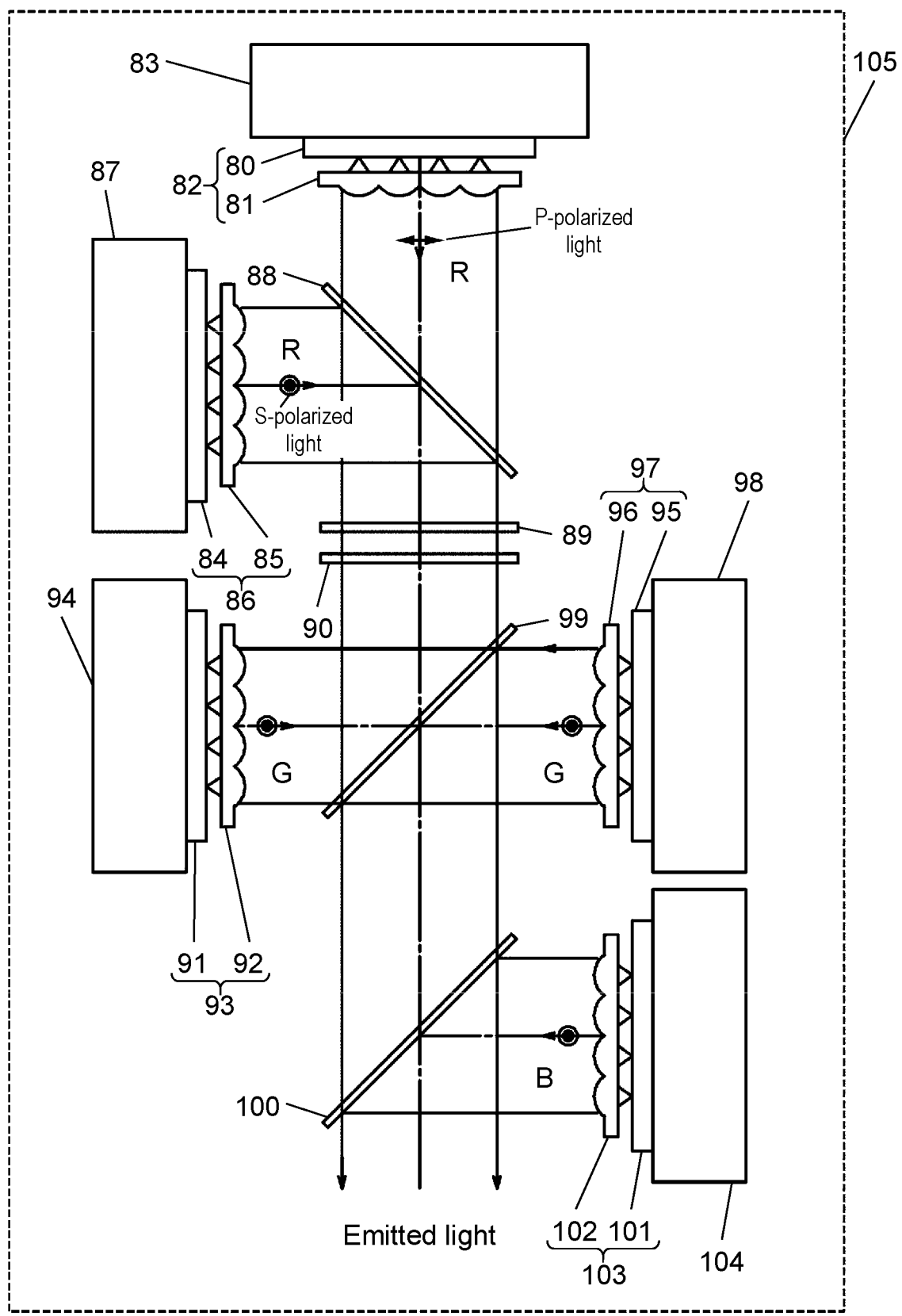
FIG. 5 is a configuration diagram of a light source device according to a third exemplary embodiment of the present disclosure.

FIG. 5 is a configuration diagram of third light source device 105 according to a third exemplary embodiment of the present disclosure.

Third light source device 105 includes red laser light sources 82, 86, green laser light sources 93, 97, and blue laser light source 103.

Red laser light source 82 includes red semiconductor laser substrate 80 on which a plurality of red semiconductor laser elements is disposed and collimating lens array 81, and red laser light source 86 includes red semiconductor laser substrate 84 on which a plurality of red semiconductor laser elements is disposed and collimating lens array 85. Green laser light source 93 includes green semiconductor laser substrate 91 on which a plurality of green semiconductor laser elements is disposed and collimating lens array 92, and green laser light source 97 includes green semiconductor laser substrate 95 on which a plurality of green semiconductor laser elements is disposed and collimating lens array 96. Blue laser light source 103 includes blue semiconductor laser substrate 101 on which a plurality of blue semiconductor laser elements is disposed and collimating lens array 102.

Third light source device 105 further includes heat sinks 83, 87, 94, 98, 104, first polarization mirror 88, red transmitting filter 89 as a filter element, quarter wavelength plate 90 as a retardation plate, second polarization mirror 99, and blue reflecting dichroic mirror 100. FIG. 5 illustrates polarization directions of light beams emitted from laser light sources. Green laser light sources 93, 97 are examples of first laser light sources, blue laser light source 103 is an example of a second laser light source, and red laser light sources 82, 86 are examples of third laser light sources. Third light source device 105 is different from first light source device 46 according to the first exemplary embodiment in that first polarization mirror 88 and blue reflecting dichroic mirror 100 do not cross each other so as to prevent an occurrence of light loss at a crossing part. In addition, third light source device 105 is different from second light source device 76 according to the second exemplary embodiment in that third light source device 105 includes blue reflecting dichroic mirror 100 that combines a light beam from blue laser light source 103 after combining light beams from the plurality of red laser light sources 82, 86 and the plurality of green laser light sources 93, 97.

Red laser light source 82 includes collimating lens array 81 and red semiconductor laser substrate 80 on which 24 (6×4) red semiconductor laser elements are two-dimensionally arrayed at regular intervals. Red semiconductor laser substrate 80 emits red color light with a wavelength width of 640±8 nm, and emits light which is P-polarized with respect to first polarization mirror 88. The light emitted from red semiconductor laser substrate 80 is condensed and converted into parallel light fluxes by corresponding collimating lens array 81. Heat sink 83 cools red semiconductor laser substrate 80.

Red laser light source 86 includes collimating lens array 85 and red semiconductor laser substrate 84 on which 24 (6×4) red semiconductor laser elements are two-dimensionally arrayed at regular intervals. Red semiconductor laser substrate 84 emits red color light with a wavelength width of 640±8 nm, and emits light which is S-polarized with respect to first polarization mirror 88. The light emitted from red semiconductor laser substrate 84 is condensed and converted into parallel light fluxes by corresponding collimating lens array 85. Heat sink 87 cools red semiconductor laser substrate 84.

The laser beams from red laser light sources 82, 86 enter first polarization mirror 88 as P-polarized light and S-polarized light, respectively. First polarization mirror 88 is disposed such that the incidence angle is 45 degrees.

First polarization mirror 88 functions as a polarization beam splitter for red laser beam. First polarization mirror 88 transmits 95% or more of P-polarized red laser beam, and reflects 95% or more of S-polarized red laser beam. The combined red laser beam using polarization enters red transmitting filter 89.

Green laser light source 93 includes collimating lens array 92 and green semiconductor laser substrate 91 on which 24 (6×4) green semiconductor laser elements are two-dimensionally arrayed at regular intervals. Green semiconductor laser substrate 91 emits green color light with a wavelength width of 525±8 nm, and emits light which is S-polarized with respect to second polarization mirror 99. The light emitted from green semiconductor laser substrate 91 is condensed and converted into parallel light fluxes by corresponding collimating lens array 92. Heat sink 94 cools green semiconductor laser substrate 91.

Green laser light source 97 includes collimating lens array 96 and green semiconductor laser substrate 95 on which 24 (6×4) green semiconductor laser elements are two-dimensionally arrayed at regular intervals. Green semiconductor laser substrate 95 emits green color light with a wavelength width of 525±8 nm, and emits light which is S-polarized with respect to second polarization mirror 99. The light emitted from green semiconductor laser substrate 95 is condensed and converted into parallel light fluxes by corresponding collimating lens array 96. Heat sink 98 cools green semiconductor laser substrate 95.

The laser beams from green laser light sources 93, 97 enter second polarization mirror 99 as S-polarized light. Second polarization mirror 99 is disposed such that the incidence angle is 45 degrees.

Figure 6:
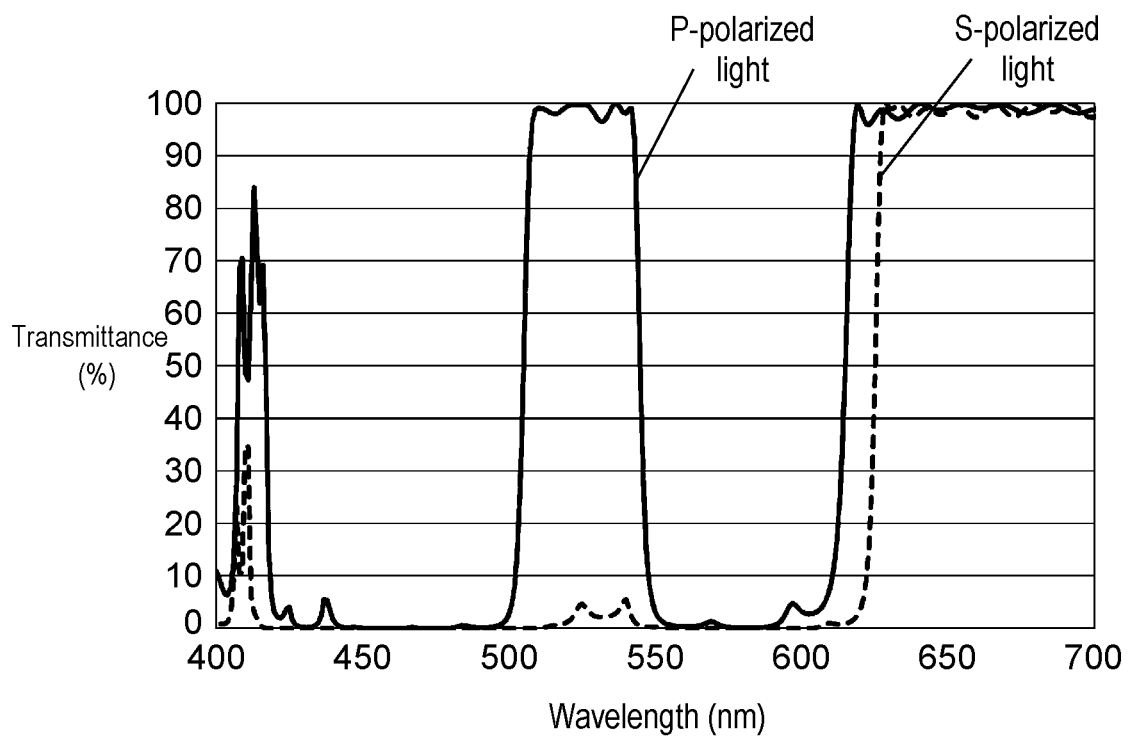
FIG. 6 is a diagram illustrating spectral characteristics of a second polarization mirror in the third exemplary embodiment.

FIG. 6 illustrates spectral characteristics of second polarization mirror 99. The spectral characteristics indicate spectral transmission factors of P-polarized light and S-polarized light at an incidence angle of 45 degrees. FIG. 6 shows the spectral characteristics of an example designed such that high refractive index materials such as TiO2 and low refractive index materials such as SiO2 are alternately laminated to form 72 optical thin films on a glass substrate of second polarization mirror 99. Second polarization mirror 99 has a characteristic of functioning as a polarization beam splitter for green laser beam and functioning as a red transmitting dichroic mirror for red laser beam. Second polarization mirror 99 transmits 95% or more of P-polarized and S-polarized red laser beams and P-polarized green laser beam, and reflects 95% or more of S-polarized green laser beam.

The S-polarized light from green laser light source 93 is reflected by second polarization mirror 99 and enters quarter wavelength plate 90. Quarter wavelength plate 90 is a retardation plate having a retardation of a quarter wavelength near the wavelength of the emission center of green laser light source 93. Quarter wavelength plate 90 is disposed with an optical axis of 45 degrees when the P-polarization direction in FIG. 5 is defined as 0 degrees. Quarter wavelength plate 90 is a thin film retardation plate utilizing birefringence by oblique vapor deposition of a dielectric material. The thin film retardation plate is made of an inorganic material, and is excellent in durability and reliability like inorganic optical crystals such as quartz. The green laser beam having passed through quarter wavelength plate 90 and converted into circularly polarized light enters red transmitting filter 89 that is provided with a reflective film such as a multilayer dielectric film, transmits red laser beam, and reflects green laser beam. The green laser beam reflected by red transmitting filter 89 is inverted in phase to be reversely circularly polarized light, passes through quarter wavelength plate 90, and is converted into P-polarized light. The P-polarized green laser beam whose polarization direction has been converted by quarter wavelength plate 90 again enters second polarization mirror 99 and passes therethrough. The S-polarized light from green laser light source 97 is reflected by second polarization mirror 99. In this way, the laser beams from the plurality of green laser light sources 93, 97 are combined.

On the other hand, the P-polarized and S-polarized red laser beams having passed through red transmitting filter 89 change in phase by quarter wavelength plate 90 to be converted into elliptically polarized light, and pass through second polarization mirror 99. In this way, the red and green laser beams are combined in a compact and highly efficient manner, and enter blue reflecting dichroic mirror 100.

Blue laser light source 103 includes collimating lens array 102 and blue semiconductor laser substrate 101 on which 12 (3×4) blue semiconductor laser elements are two-dimensionally arrayed at regular intervals. Blue semiconductor laser substrate 101 emits blue color light with a wavelength width of 465±8 nm, and emits light which is S-polarized with respect to blue reflecting dichroic mirror 100. Since the blue semiconductor laser has higher luminous efficiency and smaller light output required for desired white light chromaticity than the red and green semiconductor lasers, a number of blue semiconductor lasers is about one-fourth a number of red or green semiconductor lasers. The light emitted from blue semiconductor laser substrate 101 is condensed and converted into parallel light fluxes by corresponding collimating lens array 102. Heat sink 104 cools blue semiconductor laser substrate 101.

Red and green laser beams from second polarization mirror 99 and blue laser beam from blue laser light source 30 enter blue reflecting dichroic mirror 100. Blue reflecting dichroic mirror 100 is disposed such that the incidence angle is 45 degrees. Blue reflecting dichroic mirror 100 has a characteristic of transmitting 95% or more of green and red laser beams and reflecting 97% or more of blue laser beam. The half-value wavelength at which the transmittance is 50% is 485 nm for P-polarized light and 505 nm for S-polarized light.

In this manner, the blue, green, and red laser beams are combined in a compact and highly efficient manner to emit white light.

Third light source device 105 is slightly larger in size than first light source device 46 illustrated in FIG. 1, but does not include a dichroic mirror disposed to cross the polarization mirror. Therefore, the red, green, and blue laser beams can be combined with high efficiency without loss of light passing through and reflected by the crossing part.

Third light source device 105 is slightly larger in size than second light source device 76 illustrated in FIG. 4, but unlike second light source device 76, third light source device 105 includes a dichroic mirror that combines the light beam from blue laser light source 103 after combining light beams from the plurality of red laser light sources 82, 86 and the plurality of green laser light sources 93, 97. Therefore, first polarization mirror 88 has only spectral characteristics as a polarization beam splitter for red laser beam, and does not have spectral characteristics as a dichroic mirror. A number of optical thin films of the first polarization mirror is reduced, whereby the characteristics of the first polarization mirror can be improved at low cost.

Although the thin film retardation plate has been described as quarter wavelength plate 90, a microstructural retardation plate utilizing birefringence generated in a periodic microstructure smaller than the wavelength of light may be used.

Although the green laser light source, the red laser light source, and the blue laser light source have configurations in which 48, 48, and 12 semiconductor laser elements are arrayed, respectively, they may be configured using more semiconductor laser elements for increasing luminance. A plurality of light source devices 105 may be used to increase luminance.

Although the first laser light source is a green laser light source and the third laser light source is a red laser light source in the above description, the first laser light source may be a red laser light source and the third laser light source may be a green laser light source by changing characteristics of the first and second polarization mirrors, the retardation plate, and the filter element.

As described above, the third light source device according to the present disclosure can be constructed as a compact and highly efficient light source device having wider color gamut due to the configuration using the blue, green, and red laser light sources, the polarization mirrors having characteristics of a polarization beam splitter and a dichroic mirror, the retardation plate, and the filter element.

Fourth Exemplary Embodiment

Figure 7:
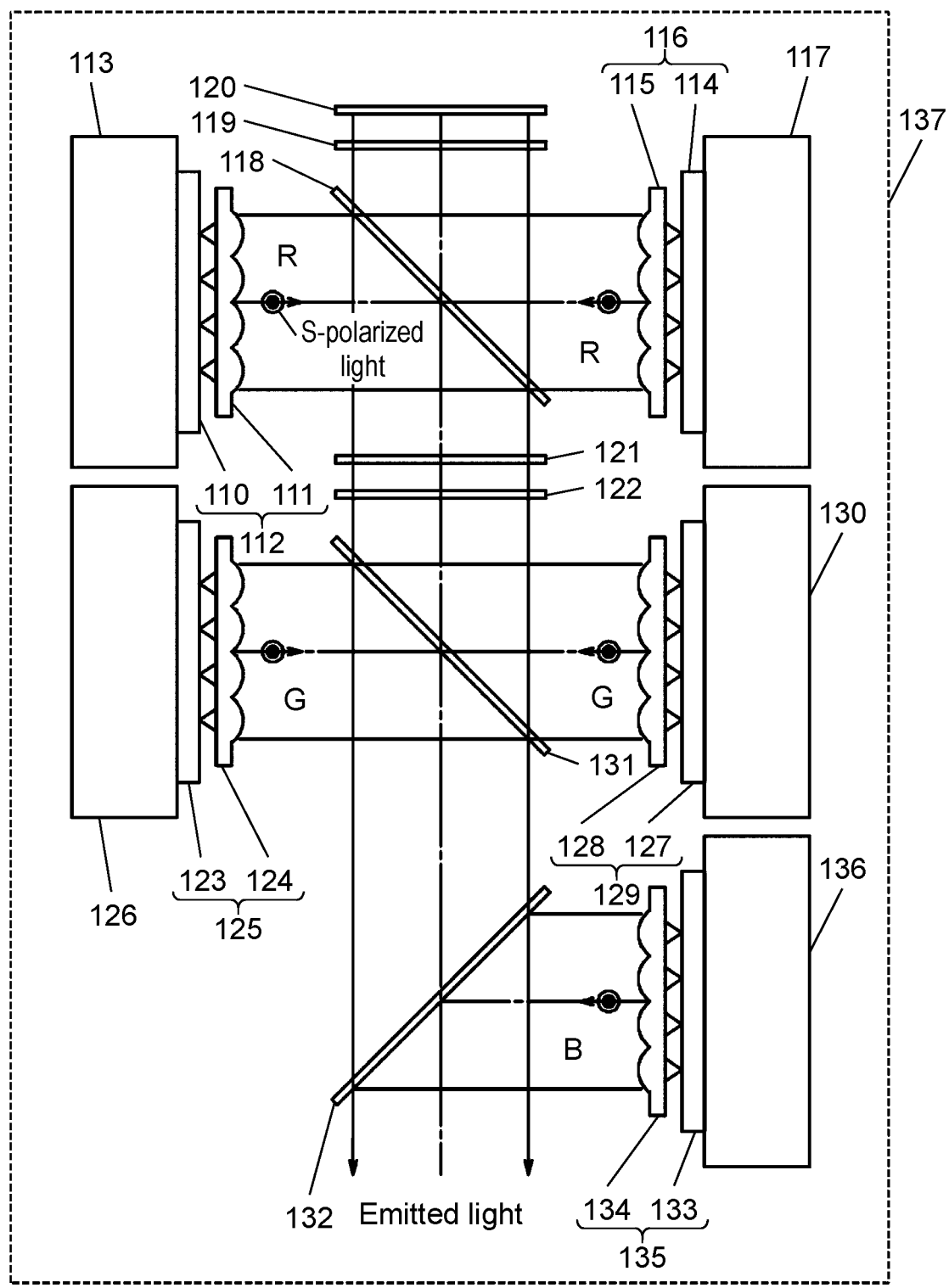
FIG. 7 is a configuration diagram of a light source device according to a fourth exemplary embodiment of the present disclosure.

FIG. 7 is a configuration diagram of fourth light source device 137 according to a fourth exemplary embodiment of the present disclosure.

Fourth light source device 137 includes red laser light sources 112, 116, green laser light sources 125, 129, and blue laser light source 135.

Red laser light source 112 includes red semiconductor laser substrate 110 on which a plurality of red semiconductor laser elements is disposed and collimating lens array 111, and red laser light source 116 includes red semiconductor laser substrate 114 on which a plurality of red semiconductor laser elements is disposed and collimating lens array 115. Green laser light source 125 includes green semiconductor laser substrate 123 on which a plurality of green semiconductor laser elements is disposed and collimating lens array 124, and green laser light source 129 includes green semiconductor laser substrate 127 on which a plurality of green semiconductor laser elements is disposed and collimating lens array 128. Blue laser light source 135 includes collimating lens array 134 and blue semiconductor laser substrate 133 on which a plurality of blue semiconductor laser elements is disposed.

Fourth light source device 137 further includes heat sinks 113, 117, 126, 130, 136, first polarization mirror 118, first quarter wavelength plate 119 that is a first retardation plate, reflective plate 120 that is a reflective element, red transmitting filter 121 that is a filter element, second quarter wavelength plate 122 that is a second retardation plate, second polarization mirror 131, and blue reflecting dichroic mirror 132. FIG. 7 illustrates polarization directions of light beams emitted from laser light sources. Green laser light sources 125, 129 are examples of first laser light sources, blue laser light source 135 is an example of a second laser light source, and red laser light sources 112, 116 are examples of third laser light sources. Fourth light source device 137 is different from the first, second, and third light source devices in that the polarization mirror and the dichroic mirror are disposed not to cross each other, and the plurality of red laser light sources and the plurality of green laser light sources are disposed to face each other using the plurality of retardation plates. Note that first polarization mirror 118, filter 121, second quarter wavelength plate 122, second polarization mirror 131, and blue reflecting dichroic mirror 132 correspond to first polarization mirror 88, filter 89, quarter wavelength plate 90, second polarization mirror 99, and blue reflecting dichroic mirror 100 of third light source device 105, respectively.

Red laser light source 112 includes collimating lens array 111 and red semiconductor laser substrate 110 on which 24 (6×4) red semiconductor laser elements are two-dimensionally arrayed at regular intervals. Red semiconductor laser substrate 110 emits red color light with a wavelength width of 640±8 nm, and emits light which is S-polarized with respect to first polarization mirror 118. The light emitted from red semiconductor laser substrate 110 is condensed and converted into parallel light fluxes by corresponding collimating lens array 111. Heat sink 113 cools red semiconductor laser substrate 110.

Red laser light source 116 includes collimating lens array 115 and red semiconductor laser substrate 114 on which 24 (6×4) red semiconductor laser elements are two-dimensionally arrayed at regular intervals. Red semiconductor laser substrate 114 emits red color light with a wavelength width of 640±8 nm, and emits light which is S-polarized with respect to first polarization mirror 118. The light emitted from red semiconductor laser substrate 114 is condensed and converted into parallel light fluxes by corresponding collimating lens array 115. Heat sink 117 cools red semiconductor laser substrate 114.

The laser beams from red laser light sources 112, 116 enter first polarization mirror 118 as S-polarized light. First polarization mirror 118 is disposed such that the incidence angle is 45 degrees.

First polarization mirror 118 functions as a polarization beam splitter for red laser beam. First polarization mirror 118 transmits 95% or more of P-polarized red laser beam, and reflects 95% or more of S-polarized red laser beam.

The light from red laser light source 112 is reflected by first polarization mirror 118. The light from red laser light source 116 is reflected by first polarization mirror 118 and enters first quarter wavelength plate 119. First quarter wavelength plate 119 is a retardation plate having a retardation of a quarter wavelength near the wavelength of the emission center of red laser light source 116. First quarter wavelength plate 119 is disposed with an optical axis of 45 degrees when the S-polarization direction in FIG. 7 is defined as 90 degrees. First quarter wavelength plate 119 is a thin film retardation plate utilizing birefringence by oblique vapor deposition of a dielectric material. The thin film retardation plate is made of an inorganic material, and is excellent in durability and reliability like inorganic optical crystals such as quartz. The red laser beam having passed through first quarter wavelength plate 119 and converted into circularly polarized light enters reflective plate 120 that is provided with a reflective film such as a multilayer dielectric film and reflects red laser beam. The red laser beam reflected by reflective plate 120 is inverted in phase to be reversely circularly polarized light, passes through first quarter wavelength plate 119, and is converted into P-polarized light. The P-polarized red laser beam whose polarization direction has been converted by first quarter wavelength plate 119 again enters first polarization mirror 118 and passes therethrough. In this way, the laser beams from the plurality of red laser light sources 112, 116 are combined.

Green laser light source 125 includes collimating lens array 124 and green semiconductor laser substrate 123 on which 24 (6×4) green semiconductor laser elements are two-dimensionally arrayed at regular intervals. Green semiconductor laser substrate 123 emits green color light with a wavelength width of 525±8 nm, and emits light which is S-polarized with respect to second polarization mirror 131. The light emitted from green semiconductor laser substrate 123 is condensed and converted into parallel light fluxes by corresponding collimating lens array 124. Heat sink 126 cools green semiconductor laser substrate 123.

Green laser light source 129 includes collimating lens array 128 and green semiconductor laser substrate 127 on which 24 (6×4) green semiconductor laser elements are two-dimensionally arrayed at regular intervals. Green semiconductor laser substrate 127 emits green color light with a wavelength width of 525±8 nm, and emits light which is S-polarized with respect to second polarization mirror 131. The light emitted from green semiconductor laser substrate 127 is condensed and converted into parallel light fluxes by corresponding collimating lens array 128. Heat sink 130 cools green semiconductor laser substrate 127.

The laser beams from green laser light sources 125, 129 enter second polarization mirror 131 as S-polarized light. Second polarization mirror 131 is disposed such that the incidence angle is 45 degrees.

The second polarization mirror has the spectral characteristics illustrated in FIG. 6. Second polarization mirror 131 has a characteristic of functioning as a polarization beam splitter for green laser beam and functioning as a red transmitting dichroic mirror for red laser beam. Second polarization mirror 131 transmits 95% or more of P-polarized and S-polarized red laser beams and P-polarized green laser beam, and reflects 95% or more of S-polarized green laser beam.

The S-polarized light from green laser light source 129 is reflected by second polarization mirror 131 and enters second quarter wavelength plate 122. Second quarter wavelength plate 122 is a retardation plate having a retardation of a quarter wavelength near the wavelength of the emission center of green laser light source 129. Second quarter wavelength plate 122 is disposed with an optical axis of 45 degrees when the P-polarization direction in FIG. 7 is defined as 0 degrees. Second quarter wavelength plate 122 is a thin film retardation plate utilizing birefringence by oblique vapor deposition of a dielectric material. The thin film retardation plate is made of an inorganic material, and is excellent in durability and reliability like inorganic optical crystals such as quartz. The green laser beam having passed through second quarter wavelength plate 122 and converted into circularly polarized light enters red transmitting filter 121 that is provided with a reflective film such as a multi-layer dielectric film, transmits red laser beam, and reflects green laser beam. The green laser beam reflected by red transmitting filter 121 is inverted in phase to be reversely circularly polarized light, passes through second quarter wavelength plate 122, and is converted into P-polarized light. The P-polarized green laser beam whose polarization direction has been converted by second quarter wavelength plate 122 again enters second polarization mirror 131 and passes therethrough. The S-polarized light from green laser light source 125 is reflected by second polarization mirror 131. In this way, the laser beams from the plurality of green laser light sources 125, 129 are combined.

On the other hand, the P-polarized and S-polarized red laser beams having passed through red transmitting filter 121 changes in phase by second quarter wavelength plate 122 to be converted into elliptically polarized light, and pass through second polarization mirror 131. In this manner, the red and green laser beams are combined in a compact and highly efficient manner.

Blue laser light source 135 includes collimating lens array 134 and blue semiconductor laser substrate 133 on which 12 (3×4) blue semiconductor laser elements are two-dimensionally arrayed at regular intervals. Blue semiconductor laser substrate 133 emits blue color light with a wavelength width of 465±8 nm, and emits light which is S-polarized with respect to blue reflecting dichroic mirror 132. Since the blue semiconductor laser has higher luminous efficiency and smaller light output required for desired white light chromaticity than the red and green semiconductor lasers, a number of blue semiconductor lasers is about one-fourth a number of red or green semiconductor lasers. The light emitted from blue semiconductor laser substrate 133 is condensed and converted into parallel light fluxes by corresponding collimating lens array 134. Heat sink 136 cools blue semiconductor laser substrate 133.

Red and green laser beams from second polarization mirror 131 and blue laser beam from blue laser light source 135 enter blue reflecting dichroic mirror 132. Blue reflecting dichroic mirror 132 is disposed such that the incidence angle is 45 degrees. Blue reflecting dichroic mirror 132 has a characteristic of transmitting 95% or more of green and red laser beams and reflecting 97% or more of blue laser beam. The half-value wavelength at which the transmittance is 50% is 485 nm for P-polarized light and 505 nm for S-polarized light.

In this manner, the blue, green, and red laser beams are combined in a compact and highly efficient manner to emit white light.

Fourth light source device 137 is slightly larger in size than first light source device 46 illustrated in FIG. 1, but does not include a dichroic mirror disposed to cross the polarization mirror. Therefore, the red, green, and blue laser beams can be combined with high efficiency without loss of light passing through and reflected by the crossing part.

Fourth light source device 137 is slightly larger in size than second light source device 76 illustrated in FIG. 4, but unlike second light source device 76, fourth light source device 137 includes a dichroic mirror that combines the light beam from blue laser light source 135 after combining light beams from the plurality of red laser light sources 112, 116 and the plurality of green laser light sources 125, 129. Therefore, first polarization mirror 118 has only spectral characteristics as a polarization beam splitter for red laser beam, and does not have spectral characteristics as a dichroic mirror. A number of optical thin films of the first polarization mirror is reduced, whereby the characteristics of the first polarization mirror can be improved at low cost.

Fourth light source device 137 can be further downsized, because, unlike third light source device 105 illustrated in FIG. 5, the plurality of red laser light sources 112, 116 are disposed to face each other in fourth light source device 137.

Although the thin film retardation plate has been described as quarter wavelength plates 119, 122, a microstructural retardation plate utilizing birefringence generated in a periodic microstructure smaller than the wavelength of light may be used.

Although the green laser light source, the red laser light source, and the blue laser light source have configurations in which 48, 48, and 12 semiconductor laser elements are arrayed, respectively, they may be configured using more semiconductor laser elements for increasing luminance. A plurality of light source devices 137 may be used to increase luminance.

Although the first laser light source is a green laser light source and the third laser light source is a red laser light source in the above description, the first laser light source may be a red laser light source and the third laser light source may be a green laser light source by changing characteristics of the first and second polarization mirrors, the retardation plate, and the filter element.

As described above, the fourth light source device according to the present disclosure can be constructed as a compact and highly efficient light source device having wider color gamut due to the configuration using the blue, green, and red laser light sources, the polarization mirrors having characteristics of a polarization beam splitter and a dichroic mirror, the plurality of retardation plates, and the filter element.

Fifth Exemplary Embodiment

Figure 8:
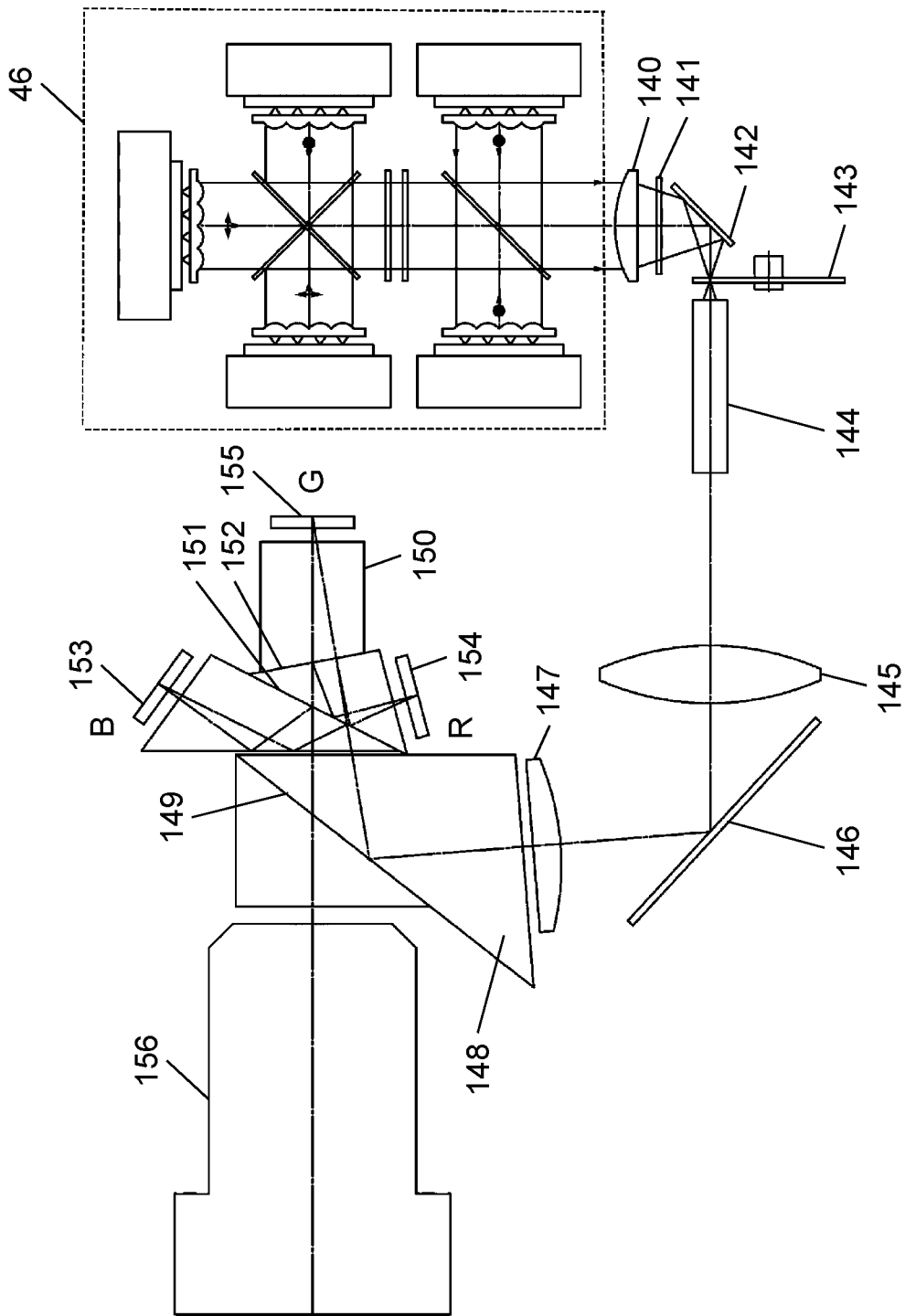
FIG. 8 is a configuration diagram of a projection display apparatus according to a fifth exemplary embodiment of the present disclosure.

FIG. 8 illustrates a first projection display apparatus according to a fifth exemplary embodiment of the present disclosure. Three digital micromirror devices (DMDs) are used as an image former. First light source device 46 described in the first exemplary embodiment of the present disclosure is used as a light source device.

First projection display apparatus further includes condenser lens 140, diffusion plate 141, reflection mirror 142, rotary diffusion plate 143, rod 144, relay lens 145, reflection mirror 146, field lens 147, total reflection prism 148, air layer 149, color prism 150 including three prisms provided with blue reflecting dichroic mirror 151 and red reflecting dichroic mirror 152, DMDs 153, 154, 155, and projection lens 156.

Blue, green, and red laser beams emitted from light source device 46 pass through condenser lens 140, then are diffused by diffusion plate 141, are reflected by reflection mirror 142, and then are condensed on rotary diffusion plate 143. Diffusion plate 141 has a diffusion surface obtained by forming microlenses formed on a glass substrate in an array, and diffuses incident light. The diffusion angle that is the half-value angle width which corresponds to 50% of the maximum intensity of the diffusion light is approximately 2 degrees, and the degree of diffusion is reduced in order to suppress loss due to diffusion. Rotary diffusion plate 143 includes a circular diffusion plate in which a diffusion layer having micro irregularities is formed on one surface of a glass substrate, and a motor in a central portion, and the rotation of rotary diffusion plate 143 is controllable. The diffusion angle of rotary diffusion plate 143 is approximately 10 degrees. A random interference pattern on a screen caused by laser beam varies temporally and spatially at a high speed by rotary diffusion plate 143, by which speckle noise can be eliminated. In addition, small luminance unevenness caused by a small emission size and a number of emissions of the laser light sources can be eliminated in cooperation with diffusion plate 141. Light diffused by rotary diffusion plate 143 enters rod 144.

The light entering rod 144 is reflected a plurality of times inside the rod, so that the light intensity distribution is uniformized. Then, the resultant light is emitted. The light emitted from rod 144 is condensed by relay lens 145, reflected by reflection mirror 146, passes through field lens 147, and enters total reflection prism 148. Total reflection prism 148 includes two prisms, and thin air layer 149 is formed on surfaces of the prisms close to each other. Air layer 149 totally reflects light incident at an angle equal to or larger than the critical angle. The light from field lens 147 is reflected by a total reflection surface of total reflection prism 148 and enters color prism 150. Color prism 150 includes three prisms, and blue reflecting dichroic mirror 151 and red reflecting dichroic mirror 152 are formed on surfaces of the prisms close to each other, respectively. The light is separated into blue, red, and green color lights by blue reflecting dichroic mirror 151 and red reflecting dichroic mirror 152 of color prism 150, and enter DMDs 153, 154, 155, respectively. DMDs 153, 154, 155 deflect the micromirror according to the image signal, and reflect the light into light entering projection lens 156 and light traveling to an area outside the effective area of projection lens 156. The light reflected by DMDs 153, 154, 155 passes through color prism 150 again. During transmission through color prism 150, the separated blue, red, and green color lights are combined and enter total reflection prism 148. Since the light entering total reflection prism 148 enters air layer 149 at a critical angle or less, the light passes through total reflection prism 148 and enters projection lens 156. In this way, the image light formed by DMDs 153, 154, 155 is enlarged and projected onto a screen (not illustrated).

Since DMDs are used as the image former, the projection display apparatus has higher light resistance and heat resistance as compared with an apparatus provided with an image former using liquid crystal. Further, since three DMDs are used, a bright and high-definition projection image with good color reproduction can be obtained. As the light source device, second light source device 76, third light source device 105, or fourth light source device 137 may be used instead of first light source device 46.

As described above, the first projection display apparatus according to the present disclosure uses a light source device which is downsized due to the configuration including the blue, green, and red laser light sources, the polarization mirrors having characteristics of a polarization beam splitter and a dichroic mirror, the retardation plate, and the filter element. In addition, speckle noise of light from the light source device is eliminated by the rotary diffusion plate. Therefore, a compact and highly efficient projection display apparatus which can eliminate speckle noise and luminance unevenness can be achieved.

Sixth Exemplary Embodiment

Figure 9:
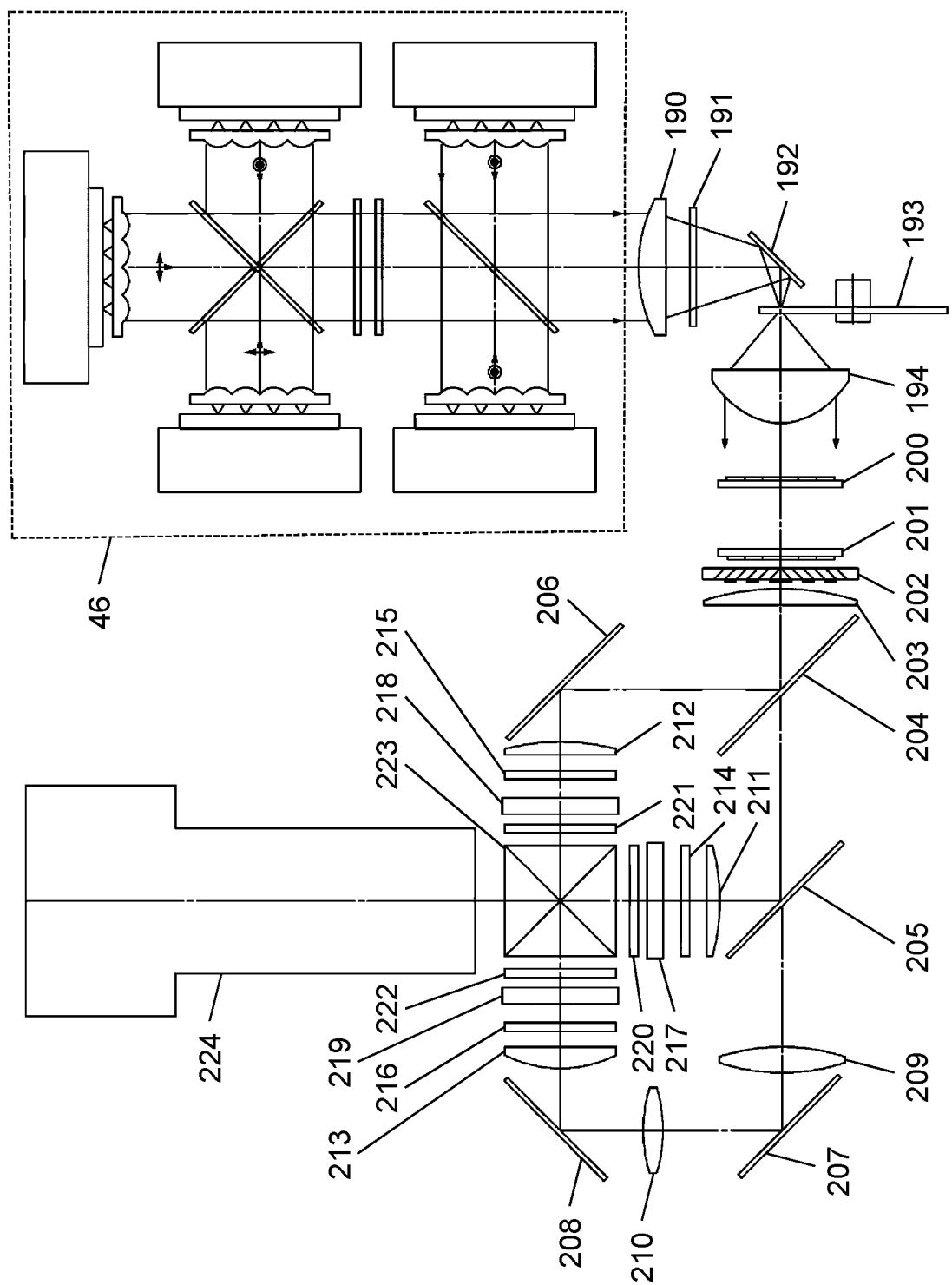
FIG. 9 is a configuration diagram of a projection display apparatus according to a sixth exemplary embodiment of the present disclosure.

FIG. 9 illustrates a second projection display apparatus according to a sixth exemplary embodiment of the present disclosure. As an image former, an active matrix-type transmissive liquid crystal panel of a TN mode or VA mode in which a thin film transistor is formed in a pixel region is used. First light source device 46 described in the first exemplary embodiment of the present disclosure is used as a light source device.

The second projection display apparatus further includes condenser lenses 190, 194, diffusion plate 191, reflection mirror 192, rotary diffusion plate 193, first lens array plate 200, second lens array plate 201, polarization conversion element 202, superposition lens 203, blue reflecting dichroic mirror 204, green reflecting dichroic mirror 205, reflection mirrors 206, 207, 208, relay lenses 209, 210, field lenses 211, 212, 213, incidence-side polarizing plates 214, 215, 216, liquid crystal panels 217, 218, 219, exit-side polarizing plates 220, 221, 222, color-combining prism 223 including a red reflecting dichroic mirror and a blue reflecting dichroic mirror, and projection lens 224.

Blue, green, and red laser beams emitted from light source device 46 pass through condenser lens 190 and diffusion plate 191, are reflected by reflection mirror 192, and then condensed on rotary diffusion plate 193. Rotary diffusion plate 193 includes a circular diffusion plate in which a diffusion layer is formed on one surface of a glass substrate, and a motor in a central portion, and the rotation of rotary diffusion plate 193 is controllable. The diffusion angle of rotary diffusion plate 193 is approximately 10 degrees. A random interference pattern on a screen caused by laser beam varies temporally and spatially at a high speed by rotary diffusion plate 193, by which speckle noise can be eliminated. In addition, small luminance unevenness caused by a small emission size and a number of emissions of the laser light sources can be eliminated in cooperation with diffusion plate 191. Light diffused by rotary diffusion plate 193 is condensed by condenser lens 194 and converted into substantially parallel light. The substantially parallel light enters first lens array plate 200 including a plurality of lens elements.

The light flux incident on first lens array plate 200 is divided into a large number of light fluxes. The multiple divided light fluxes converge on second lens array plate 201 including a plurality of lenses. The lens elements of first lens array plate 200 have apertures similar to those of liquid crystal panels 217, 218, 219. The lens elements of second lens array plate 201 have focal lengths determined such that first lens array plate 200 and liquid crystal panels 217, 218, 219 have a substantially conjugate relationship. The divided light from second lens array plate 201 enters polarization conversion element 202. Polarization conversion element 202 includes a polarization separation prism and a half wavelength plate. Polarization conversion element 202 converts the incident P-polarized light into S-polarized light, and emits the incident S-polarized light as S-polarized light. The light emitted from polarization conversion element 202 enters superposition lens 203. Superposition lens 203 is a lens for superposing lights emitted from the respective lens elements of second lens array plate 201 and illuminating liquid crystal panels 217, 218, 219 with the resultant light. First and second lens array plates 200, 201 and superposition lens 203 are used as an illumination optical system. The light from superposition lens 203 is separated into blue, green, and red color lights by blue reflecting dichroic mirror 204 and green reflecting dichroic mirror 205 which serve as a color separator. The green color light passes through field lens 211 and incidence-side polarizing plate 214 and enters liquid crystal panel 217. The blue color light is reflected by reflection mirror 206, and then, passes through field lens 212 and incidence-side polarizing plate 215 and enters liquid crystal panel 218. The red color light is transmitted through, refracted, and reflected by relay lenses 209, 210 and reflection mirrors 207, 208, passes through field lens 213 and incidence-side polarizing plate 216, and enters liquid crystal panel 219. Three liquid crystal panels 217, 218, 219 change the polarization state of the incident light by controlling a voltage applied to pixels according to the image signal, and modulate light in cooperation with incidence-side polarizing plates 214, 215, 216 and exit-side polarizing plates 220, 221, 222 which are disposed on each side of liquid crystal panels 217, 218, 219 such that their transmission axes are orthogonal to liquid crystal panels 217, 218, 219, thereby forming green, blue, and red images. The color lights passing through exit-side polarizing plates 220, 221, 222 enter color-combining prism 223 where red and blue color lights are reflected by the red reflecting dichroic mirror and the blue reflecting dichroic mirror, respectively, and combined with the green color light, and the resultant light enters projection lens 224. The light incident on projection lens 224 is enlarged and projected on a screen (not illustrated).

As the image former, three liquid crystal panels using polarized light without using a time-division system is used, so that it is possible to obtain a bright and high-definition projection image with excellent color reproduction without color breaking. In addition, a total reflection prism is unnecessary, and the color-combining prism is a small prism having an incidence angle of 45 degrees, whereby the projection display apparatus can be downsized, as compared with an apparatus using three DMD elements.

Light source device 46 may be disposed to be rotated by 90 degrees with the optical axis of emitted light as a rotation axis. If the light source device is rotated by 90 degrees, a projection display apparatus having a smaller size in the widthwise direction can be obtained. As the light source device, second light source device 76, third light source device 105, or fourth light source device 137 may be used instead of first light source device 46.

As described above, the second projection display apparatus according to the present disclosure uses a light source device which is downsized due to the configuration including the blue, green, and red laser light sources, the polarization mirrors having characteristics of a polarization beam splitter and a dichroic mirror, the retardation plate, and the filter element. In addition, speckle noise of light from the light source device is eliminated by the rotary diffusion plate. Therefore, a compact and highly efficient projection display apparatus which can eliminate speckle noise and luminance unevenness can be achieved.

Although a transmissive liquid crystal panel is used as the image former, a reflective liquid crystal panel may be used. By using the reflective liquid crystal panel, a more compact and higher-definition projection display apparatus can be obtained.

The present disclosure relates to a projection display apparatus using an image former.

What is claimed is:

1. A light source device comprising:
   a plurality of first laser light sources, a second laser light source, and a plurality of third laser light sources;
   a first polarization mirror that combines light from the plurality of first laser light sources and transmits light from the second laser light source;
   a dichroic mirror that combines the light from the plurality of first laser light sources and the light from the second laser light source;
   a second polarization mirror that combines light from the plurality of third laser light sources and transmits the light from the plurality of first laser light sources and the light from the second laser light source;
   a retardation plate that converts polarization of the light from the second polarization mirror into circular polarization; and
   a filter element that reflects light from the retardation plate.

2. The light source device according to claim 1, wherein the first polarization mirror and the first dichroic mirror are disposed to cross each other.

3. The light source device according to claim 1, wherein the plurality of first laser light sources, the second laser light source, and the plurality of third laser light sources are green laser light sources, a blue laser light source, and red laser light sources, respectively.

4. The light source device according to claim 1, wherein the plurality of first laser light sources, the second laser light source, and the plurality of third laser light sources are semiconductor lasers.

5. A projection display apparatus comprising:
   a light source that is the light source device according to claim 1;
   an illumination optical system that condenses light from the light source and illuminates a region to be illuminated;
   an image forming element that forms an image according to an image signal using light from the illumination optical system; and
   a projection lens that enlarges and projects the image formed by the image forming element.

6. A light source device comprising:
   a plurality of first laser light sources, a second laser light source, and a third laser light source;
   a first polarization mirror that combines light from the plurality of first laser light sources and transmits light from the second laser light source;
   a second polarization mirror that reflects light from the third laser light source and transmits the light from the plurality of first laser light sources and the light from the second laser light source;
   a retardation plate that converts polarization of the light from the second polarization mirror into circular polarization; and
   a filter element that reflects light from the retardation plate.

7. The light source device according to claim 6, further comprising;
   a dichroic mirror that combines the light from the plurality of first laser light sources and the light from the second laser light source,
   wherein the first polarization mirror and the first dichroic mirror are disposed to cross each other.

8. The light source device according to claim 6, wherein the plurality of first laser light sources, the second laser light source, and the third laser light source are green laser light sources, a blue laser light source, and a red laser light source, respectively.

9. The light source device according to claim 6, wherein the plurality of first laser light sources, the second laser light source, and the third laser light source are semiconductor lasers.

10. A projection display apparatus comprising:
a light source that is the light source device according to claim 6;
an illumination optical system that condenses light from the light source and illuminates a region to be illuminated;
an image forming element that forms an image according to an image signal using light from the illumination optical system; and
a projection lens that enlarges and projects the image formed by the image forming element.

* * * * *